United States Patent [19]

Volk et al.

[11] 4,445,912
[45] May 1, 1984

[54] EFFLUENT AIR FILTRATION APPARATUS

[75] Inventors: Michael Volk; David A. Metzger, both of Mansfield, Ohio; Donald H. Ostby; Robert R. Ostby, both of Muskegon, Mich.

[73] Assignee: The Mike Volk Co., Inc., Mansfield, Ohio

[21] Appl. No.: 345,623

[22] Filed: Feb. 4, 1982

[51] Int. Cl.³ .................. B01D 46/04; B01D 50/00
[52] U.S. Cl. ........................................ 55/283; 55/302; 55/324; 55/334; 55/341 R; 55/374; 55/379; 55/381; 55/418; 55/484; 55/498; 55/500; 55/502; 55/505; 55/525
[58] Field of Search ............... 55/283, 379, 378, 374, 55/492, 324, 332, 334, 341 R, 500, 350, 484, 418, 302, 381, 525, 508, 505, 498, 502, 292, 288

[56] References Cited

U.S. PATENT DOCUMENTS

| | | |
|---|---|---|
| 1,413,126 | 4/1922 | McGee . |
| 1,535,819 | 4/1925 | Emmet . |
| 2,271,662 | 2/1942 | Rubissow .......................... 55/525 X |
| 2,576,656 | 11/1951 | Wallin . |
| 2,804,168 | 4/1957 | Church . |
| 2,827,128 | 3/1958 | Hersey, Jr. . |
| 2,862,622 | 12/1958 | Kircher, Jr. et al. ............. 55/379 X |
| 2,991,981 | 7/1961 | Andersen ........................... 257/241 |
| 3,060,663 | 10/1962 | Morris et al. ..................... 55/302 |
| 3,146,080 | 8/1964 | Ruble et al. ...................... 55/96 |
| 3,178,868 | 4/1965 | Gibby ................................ 55/96 |
| 3,243,940 | 4/1966 | Larson .............................. 55/379 X |
| 3,457,787 | 7/1960 | Maatsch ........................... 73/421.5 |
| 3,498,030 | 3/1970 | Wilki ................................ 55/302 |
| 3,577,705 | 5/1971 | Sharlit ............................... 55/4 |
| 3,633,757 | 1/1972 | Madern ............................. 210/457 |
| 3,636,680 | 1/1972 | Seidel ............................... 55/291 |
| 3,726,066 | 4/1973 | Colley et al. .................... 55/302 |
| 3,735,566 | 5/1973 | Laliwala .......................... 55/273 |
| 3,813,853 | 6/1974 | Anderson ........................ 55/96 |
| 3,816,978 | 6/1974 | O'Dell .............................. 55/302 X |
| 3,838,555 | 10/1974 | Kubiak ............................. 55/96 |
| 3,853,509 | 12/1974 | Leliaert ............................ 55/378 X |
| 3,909,222 | 9/1975 | Caughlin et al. ................ 55/317 |
| 3,948,623 | 4/1976 | Ostby et al. ..................... 55/96 |
| 3,951,623 | 4/1976 | Furstenberg .................... 55/96 |
| 4,074,985 | 2/1978 | Willas .............................. 55/498 |
| 4,077,781 | 3/1978 | Sundstrom ...................... 55/96 |
| 4,149,863 | 4/1979 | Ballard ............................ 55/379 |
| 4,158,554 | 6/1979 | Bundy et al. ................... 55/379 |
| 4,242,110 | 12/1980 | Hynes ............................. 55/269 |
| 4,264,345 | 4/1981 | Miller ............................. 55/484 X |

FOREIGN PATENT DOCUMENTS

| | | | |
|---|---|---|---|
| 1906526 | 10/1970 | Fed. Rep. of Germany ........ 55/302 |
| 1081516 | 8/1967 | United Kingdom ................. 55/378 |
| 644513 | 1/1979 | U.S.S.R. ............................... 55/288 |

Primary Examiner—Kathleen J. Prunner
Attorney, Agent, or Firm—Fay & Sharpe

[57] ABSTRACT

Effluent with entrained particles is drawn through a filter module (A) by an exhaust blower (B). The filter module includes an inertial separator (C) for providing an inertial separation of particles from the effluent air and a plurality of filter cartridges (D) which allow air to pass therethrough but not particles. A plenum E interconnects the filter cartridges with the exhaust blower to channel the filtered air from the filter module to the exhaust blower. A flow controller (F) controls the flow rate of air through each of the filter cartridges maintaining it substantially constant. The flow controller includes a flow rate sensor for sensing the flow rate through each filter cartridge and a butterfly damper blade for selectively restricting the plenum to maintain the flow rate substantially constant. A filter cartridge cleaner (G) is selectively actuated when the flow controller is unable to maintain a preselected minimum flow rate. The cartridge cleaner includes a pneumatic shock wave generator disposed in the plenum in axial alignment with each of the filter cartridges. A heat exchanger housing (400) surrounds the filter module to recover heat from the filtered air.

17 Claims, 17 Drawing Figures

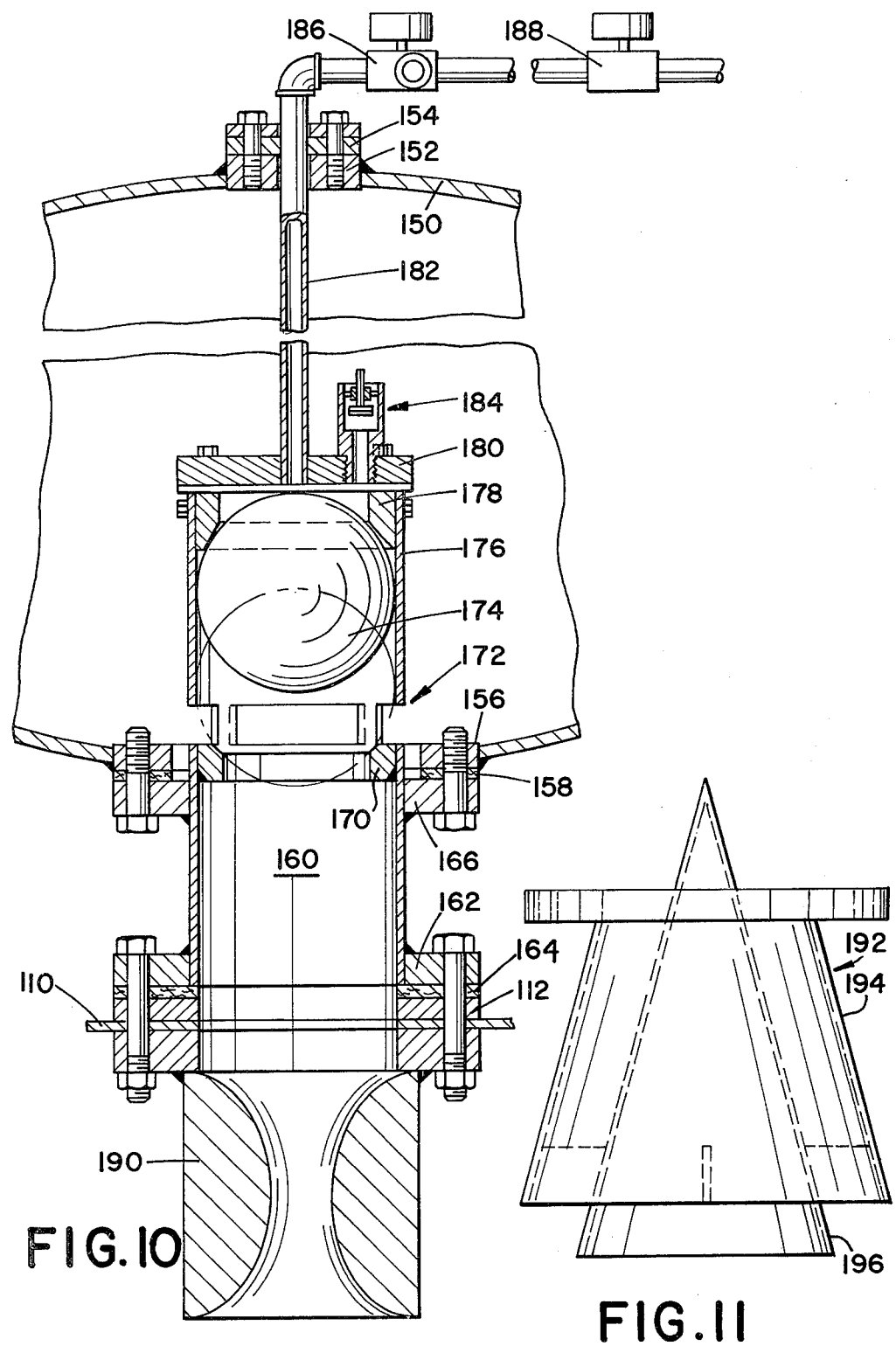

EFFLUENT AIR FILTRATION APPARATUS

BACKGROUND OF THE INVENTION

This application pertains to the art of air filtration. The invention is particularly applicable to filtration systems for removing particles from 0.1 microns or less to over 100 microns from air which is heated to a temperature between ambient air and 1500° F. or higher. The invention is further applicable to systems which operate at relatively high air to filter area ratios on the order of 30 to 100 CFM per square foot of filter media. Air filtration systems operating with these parameters find ready application in conjunction with foundry operations, coal-fired boilers, incinerators, and other high temperature processes. It is to be appreciated, however, that the invention is also applicable to filtering particles of other sizes, air at other flow rates and other temperatures, and effluent from other sources.

Heretofore, various types of filtration systems have been used for filtering air. The prior art includes cloth filter or bag house systems, electrostatic precipitators, wet scrubbers, and mechanical collectors such as cyclone, gravitational settling, or impingement separators. The cloth filter systems have had several drawbacks. Commonly, the air flow to filter ratiio is limited to about 2 to 10 CFM per square foot of effective filter area. The air must be precooled before filtering to a temperature of less than 550° F. to prevent the heat from destroying the filter bag cloth. The filter a relatively large volume of air, large plant areas must be dedicated to relatively expensive, large volume filter systems. The mechanical collectors are ineffective for removing submicron particles from the effluent gases. Electrostatic air cleaners are relatively expensive to install and have large space requirements. Further, electrostatic precipitators operate more efficiently when the effluent flow is substantially constant and when there is a controlled amount of sulfur oxides in the effluent stream. The presence of the sulfur oxides may result in conflict with air pollution regulations. The wet scrubbers are commonly ineffective for removing particles smaller than 0.5 microns. Further, wet scrubbers are relatively expensive to operate because a relatively large amount of power is required to create the large pressure drop necessary to remove the smaller particles and because water treatment facilities are required for recirculating the treatment water. In the winter, when shut down, the water is apt to freeze and when operating discharged water vapor tends to form a highly visible steam plume.

Another prior art air filtration system is described in U.S. Pat. No. 3,948,623 issued Apr. 6, 1976. In this patent, the effluent to be cleaned is drawn through a cyclonic agglomerator and into a plurality of filter modules by an exhaust blower. Each filter module has a plurality of vertical cylindrical screen units with a rotatable compressed air or water spray cleaning mechanism inside each one. Each filter module is divided into compartments such that one compartment can provide filtering while the other is removed from the effluent flow for cleaning. A cleaning cycle is initiated when the flow rate of effluent through one of the filter modules drops below a predetermined minimum. In addition to the rotating water spray cleaning mechanism, a propane gas explosion sonic shock wave generator is also disclosed. However, in high temperature applications, propane shock wave generators tend to be ignited prematurely by hot portions of the filter assembly. Further, propane gas shock wave generators and rotating compressed air or water spray cleaners are not readily adjustable to control accurately an amount of filter cake left on the filter media. Another problem with this filtration system is the difficulty in gaining access to the filter assemblies for repair and replacement. Yet another drawback is that heat energy in the effluent gas is lost.

The present invention contemplates a new and improved filtration system which overcomes the above-referenced problems and others. The present invention provides an air filtration system which removes submicron particles from large volumes of gas at elevated temperatures.

SUMMARY OF THE INVENTION

In accordance with the present invention there is provided a filtration system with an improved filter cartridge mounting assembly, an effluent flow control system, a pneumatic shock wave clean system, and a heat recovering system.

In accordance with a first aspect of the invention, there is provided an air filtration system which includes an enclosed housing, a filter cartridge, and a plenum means. The enclosed housing has an inlet aperture for receiving air to be filtered, a lower collection region for accumulating particles filtered from the received air, a top wall having a plurality of openings and a mounting flange surrounding each top wall opening for facilitating connection of a filter cartridge therewith. Each filter cartridge extends downward into the enclosed housing. The filter cartridge further has an upper filter medium mounting ring which is operatively connected with the top wall mounting flange and a lower filter medium mounting ring. A filter medium support grid is connected at one end with the upper filter medium mounting ring and at its other end with the lower filter medium mounting ring. A woven filter medium surrounds the filter medium support grid and the upper and lower filter media mounting rings. The plenum means is disposed in a fluid communication with the top wall openings for receiving filtered air from the filter cartridges.

In accordance with a second aspect of the invention, there is provided an air filtration system which includes an enclosed housing having an inlet aperture for receiving air to be filtered, a lower collection region for accumulating particles filtered from the received air, and an upper region for receiving a plurality of filter cartridges. A plurality of exhaust plenums are each connected with one of the filter cartridges for receiving filtered air therefrom. A filter cartridge cleaning means is operatively connected with the filter cartridges for selectively cleaning individual filter cartridges. A flow rate sensing means is operatively connected with each plenum for sensing the flow of filtered air therethrough. A flow rate control means controls the amount of air flowing through each plenum. The flow rate controlling means is operatively connected with the flow rate sensing means for maintaining the filtered air flow through each plenum substantially constant.

In accordance with a third aspect of the invention, there is provided a high temperature air filtration system which includes an enclosed housing having an inlet for receiving air to be filtered, a lower collection region for accumulating particles filtered from the received air, and an upper region for receiving a plurality of filter cartridges. A plenum means is opertively connected with the filter cartridges for receiving filtered air therefrom. A shock wave generator which generates shock waves to clean the filter cartridges includes a pressure reservoir, a nozzle in fluid communication with one of the filter cartridges, and a valve means for selectively permitting and blocking pressurized fluid in the pressure reservoir from flowing through the nozzle into the filter cartridge.

In accordance with a fourth aspect of the invention, there is provided a high temperature air filtration system which includes an enclosed housing having an inlet aperture for receiving air to be filtered, a lower collection region for accumulating particles filtered from the received air, an upper region for receiving a plurality of filter cartridges, and a plurality of openings in a top wall through which the filter cartridges are received. A plenum means is connected with the enclosed housing top wall openings for receiving filtered air from the filter cartridges. A heat exchanger including at least one air path at least partially surrounds the enclosed housing upper region and a portion of the plenum means.

One advantage of the present invention is that it effectively removes micron and submicron particles from relatively large flows of high temperature air.

Another advantage of the present invention is that it reclaims heat energy which otherwise would be lost to the atmosphere.

Another advantage of the present invention is that filter media are readily interchanged to alter the filtering characteristics of the system. Further, the filter cartridges are readily accessible to facilitate changing and repairing the filter media.

Another advantage of the present invention is that the filter media are relatively inexpensive and will not support combustion.

Another advantage of the present invention is that the cleaning intensity is readily adjustable to select the amount of residual filter cake to be retained on the filter media after cleaning.

Another advantage of the present invention is that air flow through the filter cartridges is readily maintained at a substantially constant rate.

Still further advantages of the present invention will become apparent to others upon reading and understanding the following detailed description of the preferred embodiment.

BRIEF DESCRIPTION OF THE DRAWINGS

The invention may take form in various parts and arrangements of parts. The drawings are for purposes of illustrating preferred and alternate embodiments of the invention only and are not to be construed as limiting the invention.

FIG. 10 is a sectional view of a pneumatic shock wave cleaning system in conjunction with a mach nozzle;

FIG. 11 is a diffusion nozzle for use in conjunction with the pneumatic shock wave cleaning system of FIG. 10;

DETAILED DESCRIPTION OF THE PREFERRED AND ALTERNATE EMBODIMENTS

Figure 1:
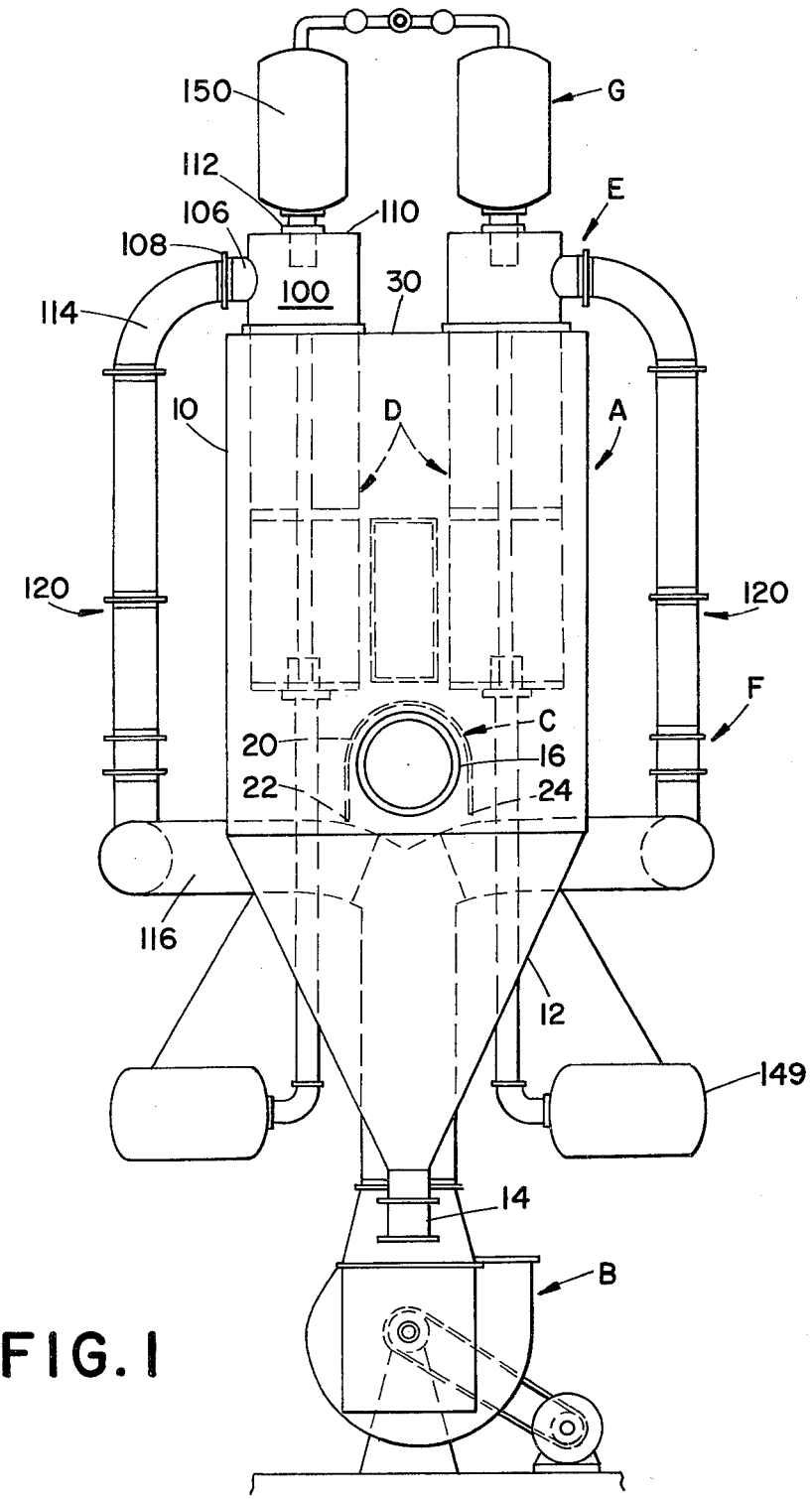
FIG. 1 is an end elevation in partial section of a filter module in accordance with the present invention.
Figure 2:
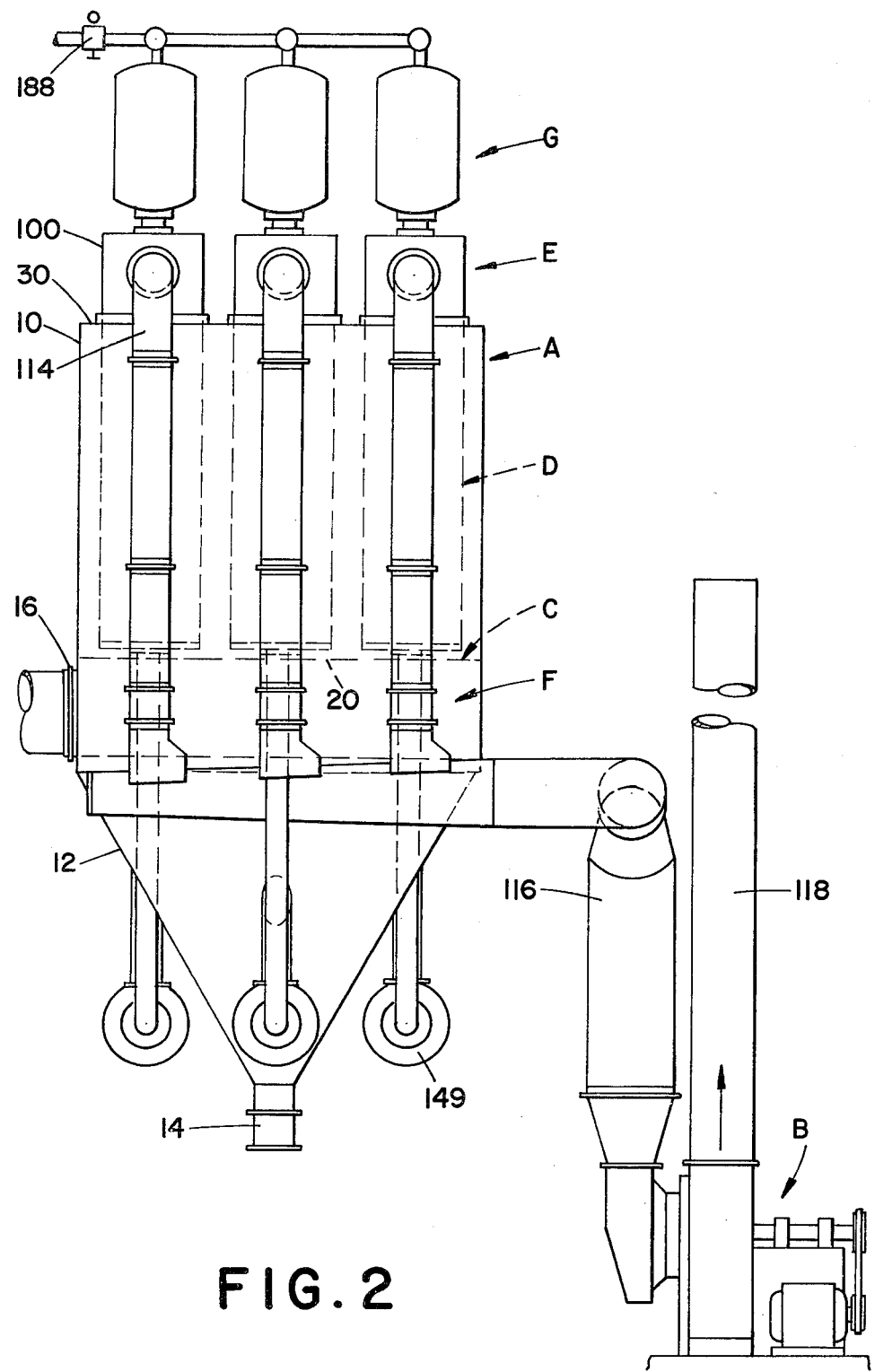
FIG. 2 is a side elevation of the filter module of FIG. 1.
Figure 3:
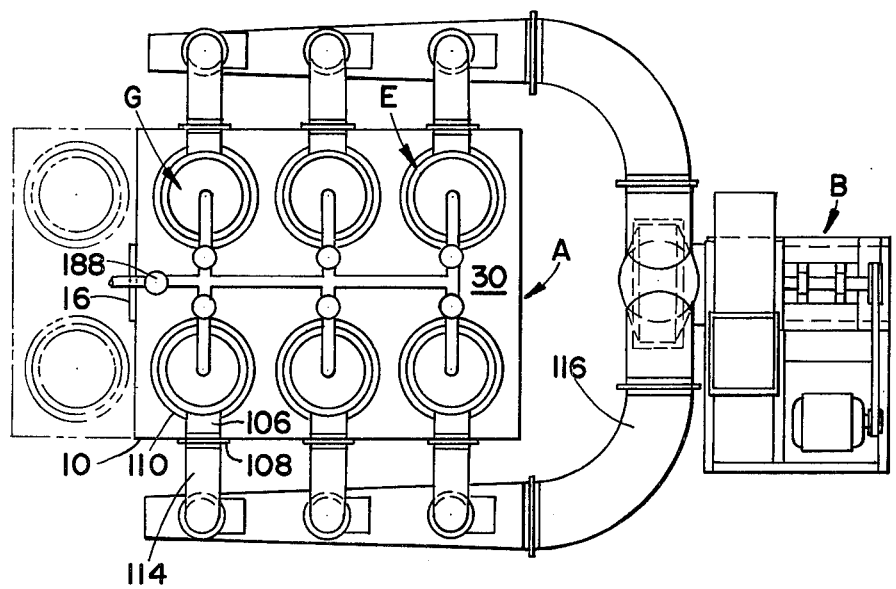
FIG. 3 is a plan view of the filter module of FIG. 1.

With reference to FIGS. 1, 2, and 3, a by-product of high temperature metal processing and other processing operations is commonly a relatively large volume of effluent air entrained with particles. The present invention separates the air from the particles and returns the clean air to the atmosphere. The effluent with entrained particles is drawn through a filter module A by an exhaust blower B. The filter module includes an inertial separator C for providing an inertial separation of particles from the effluent air and a plurality of filter cartridges D which allow the air to pass therethrough but not the particles. A plenum means E interconnects the filter cartridges with the exhaust blower B to channel the filtered air from the filter module to the exhaust blower. A flow control means F controls the flow rate of air through each of the filter cartridges. A filter cartridge cleaning means G is selectively actuatable to clean each of the filter cartridges.

Briefly stated, high temperature air with particles to be removed passes through the inertial separating means C where some of the particles, primarily the larger particles, are separated from the air flow. The air flows through the filter cartridges D building a filter cake of particles therearound. The filtered air flows through the plenum E and the flow regulating means F to the exhaust blower B and the atmosphere. When the filter cartridges are relatively clear of the filter cake, the flow regulating means restricts the flow of air through the plenum. As the filter cartridges develop a thicker filter cake slowing the flow of air, the flow regulating means decreases its restriction of the plenum, maintaining the flow of air substantially constant. When the filter cartridges become so coated with the filter cake that the flow regulating means F can no longer maintain the predetermined air flow rate, the air flow regulating means stops the flow of air through the associated filter cartridge and the cartridge cleaning means G introduces a pneumatic shock wave into the filter cartridge to knock the filter cake from its exterior. After an appropriate time for the separated filter cake to settle to the bottom of the filter module, the air flow regulating means again starts the flow of air through the cleaned filter cartridge at the preselected flow rate.

Referring to the filter module A in greater detail, the filter module includes an enclosed housing 10 which is substantially airtight. The housing includes a lower module hopper 12 which defines a lower collection region for accumulating particles filtered from the received air. A hopper discharge gate 14 is connected at the lower end of the module hopper for selectively discharging the accumulated particles and for sealing the bottom of the hopper. Disposed in a side wall of the enclosed housing 10 is an annular inlet duct angle ring 16 which is adapted to be connected with an effluent inlet duct. The inlet ring defines an effluent inlet into the housing.

The inertial separating means C includes a generally U-shaped impingement plate 20 which extends from the effluent inlet housing side wall to the opposing side wall. The generally U-shaped impingement plate has first and second terminal edges 22 and 24 which are disposed below the effluent inlet. This causes the received effluent to move downward toward the impingement plate terminal edges and toward the accumulated particle collecting region. After passing the impingement plate terminal edges, the effluent turns about 180° and moves towards the filter cartridges D. Some of the particles, particularly the heavier particles, are caused by their inertia to continue moving downward into the collection region even as the air moves upward toward the filter cartridges.

With reference to FIGS. 1-5, the enclosed housing 10 further has a top wall 30 which has a plurality of filter cartridge receiving openings therethrough. In the preferred embodiment, there are six filter cartridge receiving openings and six filter cartridges. It is to be appreciated, however, that a larger or smaller number of filter cartridges may be provided to accommodate the anticipated flow volume of effluent air in the intended application. With reference to the exemplary top wall filter cartridge mounting assembly illustrated in FIG. 5, surrounding each filter cartridge receiving opening is a top wall cartridge mounting flange 32 and a vertically extending sleeve portion 33. In this manner, the mounting flange 32 is displaced from the top wall by the sleeve portion 33. An upper cartridge mounting gasket 34 is disposed on the top wall annular mounting flange 32.

Figure 4:
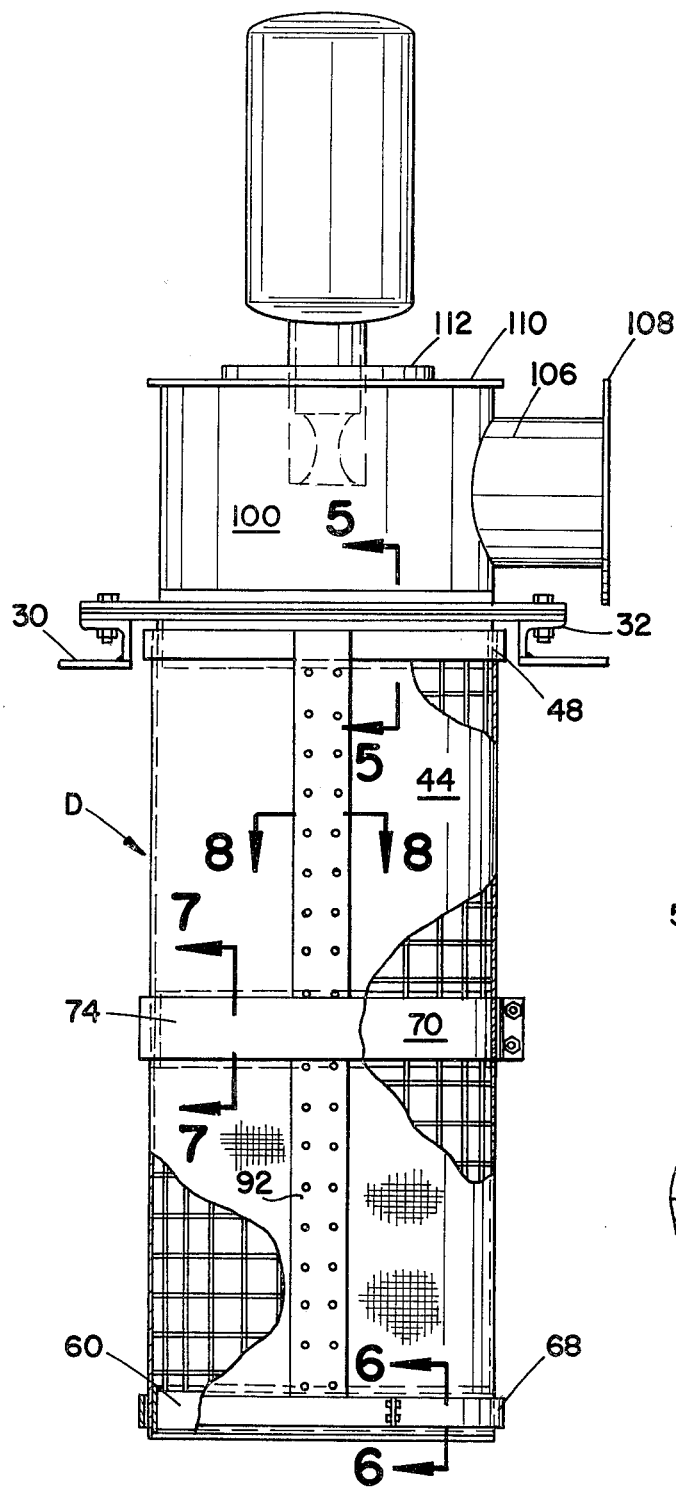
FIG. 4 is a side elevation in partial section of a filter cartridge assembly of the filter module of FIG. 1.
Figure 5:
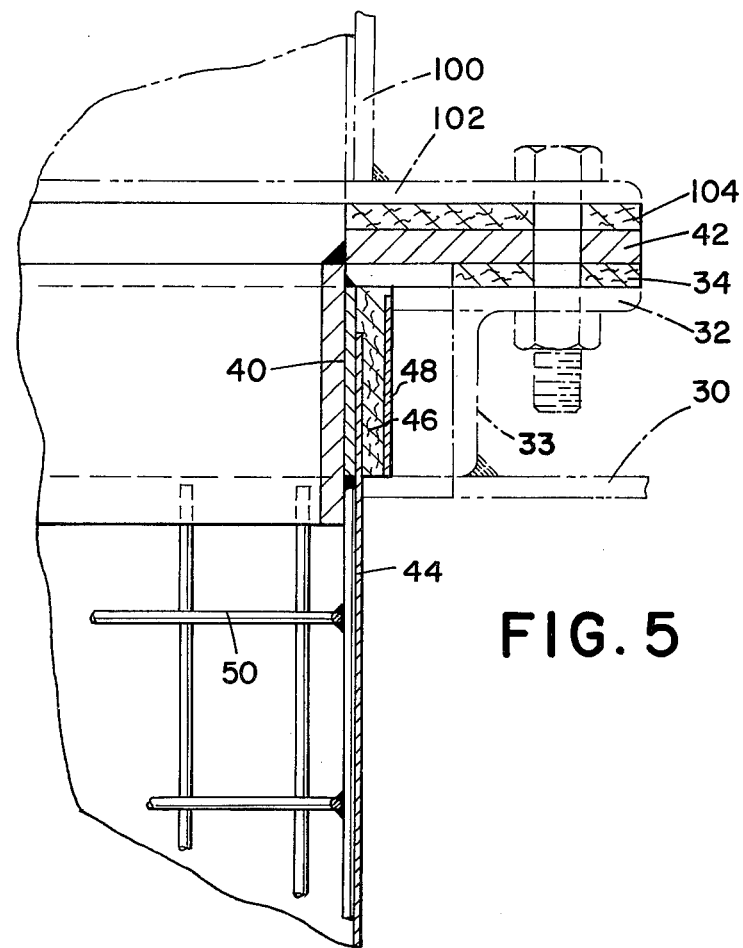
FIG. 5 is a sectional view through section 5—5 of FIG. 4.

With reference to FIGS. 4 and 5, a typical one of the filter cartridge D has an upper filter medium mounting ring 40 which is smaller in diameter than the housing top wall openings such that the filter cartridge may be passed through the openings in the housing top wall. The upper filter medium mounting ring 40 is connected with an outward extending, upper filter cartridge mounting plate 42 which is disposed on the upper filter cartridge mounting gasket 34. The upper filter cartridge mounting plate 42, the cartridge mounting gasket 34, and the top wall cartridge mounting ring 32 have a plurality of aligned fastener receiving apertures therethrough. This enables the filter cartridge to be fastened to the top wall 30. A cylinder of filter medium 44 is wrapped around the upper filter medium mounting ring 40. To improve the frictional engagement between the filter medium and the upper filter medium mounting ring, an upper filter medium gasket 46 is disposed peripherally around and lapping the filter medium and the upper filter medium mounting ring 40. An upper filter medium clamp 48 surrounds the upper filter medium gasket, the upper edge of the filter medium, and the upper filter medium mounting ring for selectively compressing them into a substantially airtight frictional seal. A filter medium support grid 50 extends downward from the upper filter medium mounting ring 40. The filter media support grid is a cylinder of non-woven welded wire which presents a relatively smooth yet open support surface for the filter medium 44.

Figure 6:
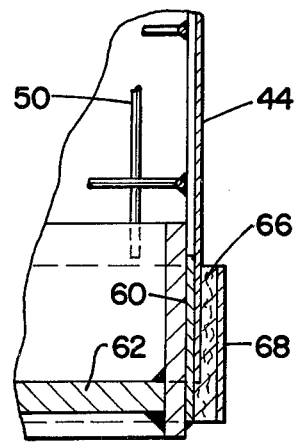
FIG. 6 is a sectional view through section 6—6 of FIG. 4.

With particular reference to FIGS. 4 and 6, the filter medium support grid 50 is connected with a lower filter medium mounting ring 60. A filter cartridge lower sealing plate 62 is connected with the lower filter medium mounting ring 60 to provide a fluid seal along the bottom of the filter cartridge. In the preferred embodiment, the upper and lower filter medium mounting rings and the filter medium support grid are circular in cross section and have generally the same diameter such that the filter cartridge is cylindrical. Optionally, these components may have noncircular cross sections, such as oval, square, rectangular, or the like. Further, the upper and lower filter medium mounting rings may be of different sizes and the filter medium support grid may taper.

The lower filter mounting ring is disposed in frictional contact with a lower part of the filter medium 44. A lower filter medium gasket 66 and a lower filter medium clamp 68 are disposed peripherally around and lapping the lower filter medium mounting ring and the lower portion of the filter medium. The lower filter medium clamp clamps the lower filter medium gasket and the lower portion of the filter medium into a tight, fluid sealing engagement with the lower filter medium mounting ring 60.

Figure 7:
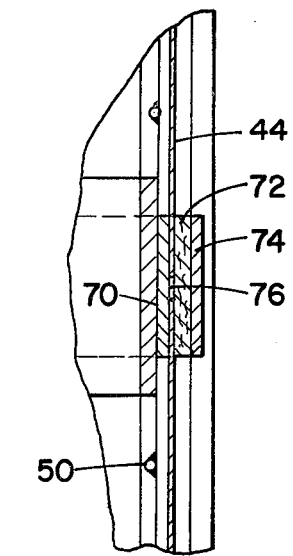
FIG. 7 is a sectional view through section 7—7 of FIG. 4.

With particular reference to FIGS. 4 and 7, the filter cartridge has an intermediate filter medium mounting ring 70 disposed midway between the upper and lower mounting rings. The support grid 50 is connected with the intermediate filter medium mounting ring. The intermediate filter medium mounting ring is disposed in frictional contact with an intermediate portion of the filter medium 44. An intermediate filter medium gasket 72 and an intermediate filter medium clamp 74 compress the filter medium firmly against the filter medium mounting ring 70. In the preferred embodiment, the filter medium cylinder 44 is constructed in two parts—an upper filter medium cylinder and a lower filter medium cylinder. The intermediate filter medium gasket 72 laps a horizontal joint 76 between the upper and lower filter medium cylinders.

Figure 8:
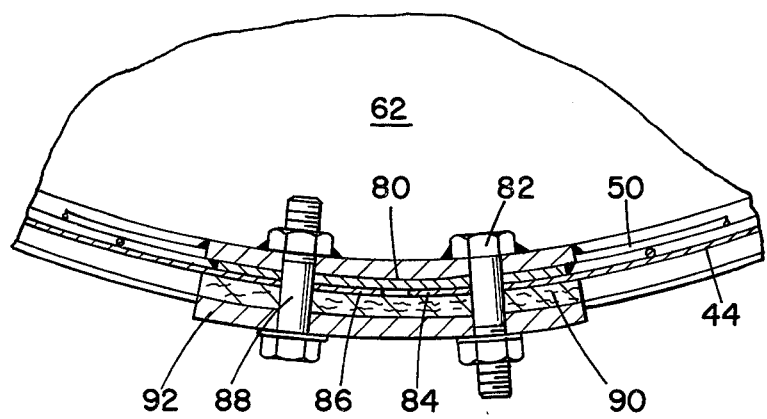
FIG. 8 is a sectional view through section 8—8 of FIG. 4.

With particular reference to FIGS. 4 and 8, a filter medium support grid joint bar 80 connects vertical edges of the support grid 50 into a cylindrical form. The joint bar 80 extends generally vertically between the upper and lower filter medium mounting rings. Integrally connected with the joint bar are a column of outward extending mechanical fasteners 82 such as bolts. The joint bar defines a column of apertures extending parallel to the mechanical fastener column. The filter medium 44 has a plurality of apertures adjacent a first filter medium vertical edge 84. The filter medium first edge apertures are disposed to align with the mechanical fasteners 82. This facilitates mounting of the filter medium by allowing the filter medium first edge to be accurately held in place as the filter medium is stretched around the filter medium mounting grid 50. The filter medium has a second plurality of apertures adjacent a second generally vertical filter medium edge 86 which are adapted to receive mechanical fasteners 88 such as bolts which are threadingly received in nuts that are welded to the joint bar 80 in alignment with each aperture of the joint bar aperture column. When assembled, a filter medium joint gasket 90 overlays the filter medium first and second edges and a filter medium joing gasket compression bar 92 overlays the joint gasket. The mechanical fasteners are adapted to compress the compressing bar 92, the joint gasket 90, and the filter medium edges tightly against the joint bar 80 to form an airtight seal.

The filter medium 44 comprises a woven wire mesh. Various weaves of filter mesh may be selected as is appropriate to the filtering operation to be undertaken. It is further to be appreciated that the filter medium may be readily modified with changes in the nature of the filtering operation to be performed by the filtration system. In the preferred embodiment, the filter medium is 280×70 reverse plain Dutch weave. Other weaves such as plain Dutch, twilled Dutch, and the like are also suitable. Although a weave of 250×50 or greater is preferred, the weave size may be selected to match the particular application. Suitable woven meshes are available from numerous commercial sources. Optionally, the filtration efficiency of the woven mesh can be improved by calendering the woven filter mesh i.e., running the filter medium through steel rolls which compress and flatten the wires decreasing the openings therebetween. Calendered woven mesh filters are efficient in filtering 0.1 micron particles when filtering effluent gases at a rate of 100 CFM per square foot of filter area.

With particular reference again to FIGS. 1, 2, and 3, the plenum means E includes a plurality of generally tubular removable exhaust plenum side walls 100, one corresponding to each of the filter cartridges. As illustrated in greater detail in FIG. 5, each of exhaust plenum side walls has an exhaust plenum mounting ring 102 having a plurality of bolt holes extending therethrough. The exhaust plenum mounting ring and an exhaust plenum mounting gasket 104 are adapted to be mounted on the upper filter cartridge mounting plate 42. The plenum means has an outward extending exhaust duct connection extension 106 terminating in an exhaust duct connecting angle ring 108. The exhaust duct extension 106, in the embodiment of FIGS. 1–3, is disposed perpendicular to a central axis of the plenum side wall 100. Optionally, the exhaust duct extension 106 may extend tangentially from the exhaust side wall such that a cyclonic swirling of air through the filter cartridges is developed to improve particle separation. Each of the plenum side walls 100 is connected with a plenum cover plate 110 which has an aperture therethrough surrounded by a shock wave generator mounting flange 112. Each of the exhaust duct extensions 106 is connected with an individual exhaust duct 114 which connects with an exhaust duct manifold 116 which in turn connects with the exhaust blower B and an exhaust stack 118.

Figure 9:
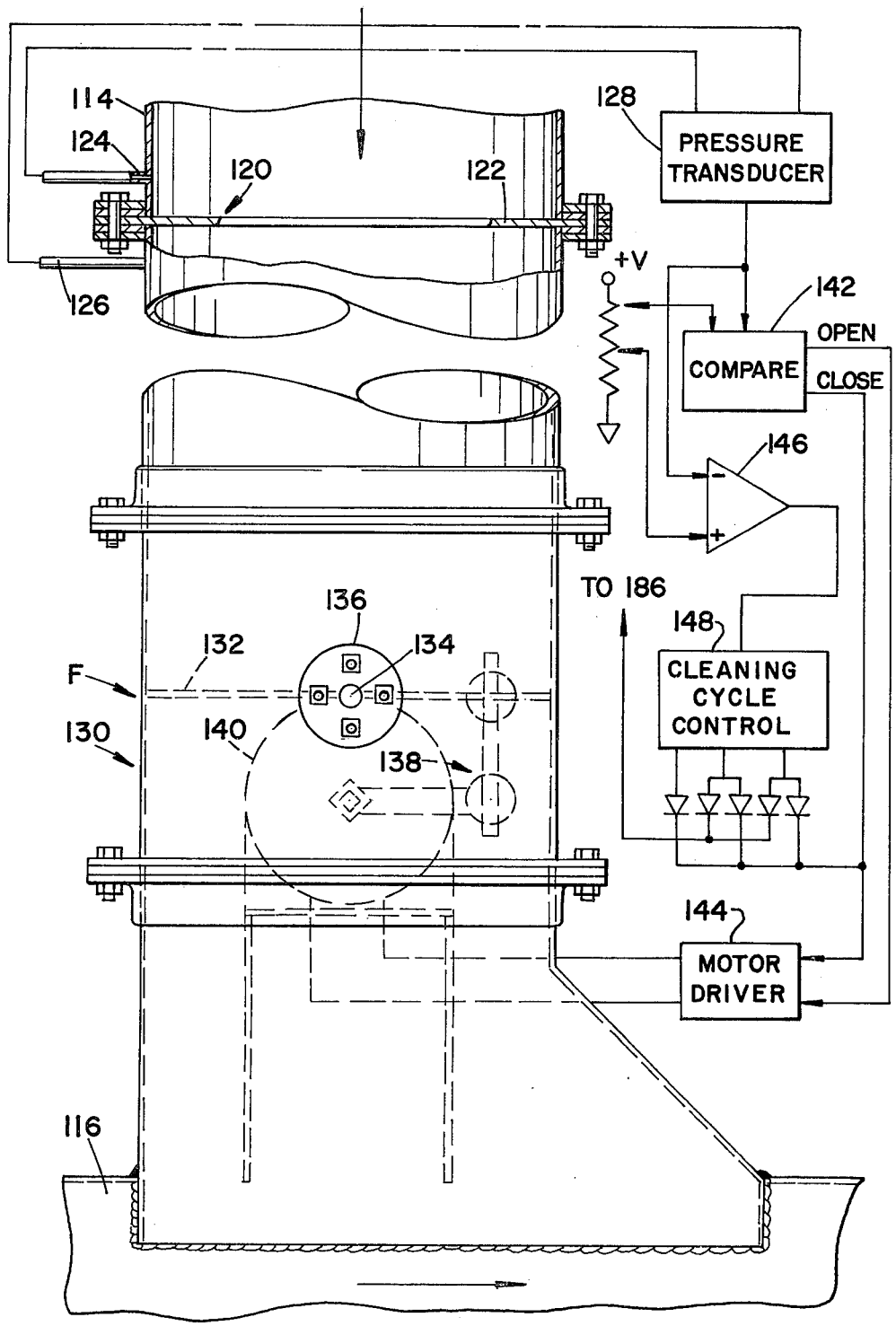
FIG. 9 is a detailed view of the air flow regulating system of FIG. 1.

With continued reference to FIG. 1 and further reference to FIG. 9, as the filtered air moves through the exhaust duct 114, its flow rate is controlled by the flow rate control means F. The flow rate control means includes a flow rate sensing means 120 for sensing the rate of flow through the exhaust duct 114. The flow rate sensing means includes a sharp edge orifice plate 122 which is disposed in the exhaust duct such that the air flows through a restricted central orifice. The air accelerates away from the walls of the duct, through the central orifice, and slows into contact with the duct walls on the other side of the orifice plate. The movement of the air away from the duct walls creates a low pressure region immediately adjacent the orifice plate. The pressure or vacuum in the low pressure region is indicative of the flow rate. Disposed adjacent the upstream side of the orifice plate is a pressure monitoring tap 124 and immediately adjacent the downstream side of the orifice plate is a downstream pressure monitoring tap 126. The upstream and downstream pressure monitoring taps are connected with a pneumo-electric pressure transducer 128 which converts the air pressure to an electric signal which varies with the velocity of air in cubic feet per minute. Optionally, other commercially available flow monitoring devices may be used.

Disposed downstream from the flow rate sensing means 120 is a flow regulating means 130. The flow rate controlling means includes a butterfly damper blade 132 which is disposed in the exhaust duct 114 and has a peripheral shape which conforms with the interior cross section of the exhaust duct. The butterfly damper blade is mounted on a butterfly damper operating shaft 134 which is pivotally mounted in butterfly damper shaft seals 136. The butterfly damper operating shaft is connected by a butterfly damper operating linkage 138 with a butterfly damper control motor 140. Although explained below in greater detail in conjunction with FIGS. 12A, B, and C, a simplified control circuit for the butterfly damper control motor 140 and the cleaning means G is illustrated in conjunction with FIG. 9 to facilitate understanding of the broader aspects of the invention. Briefly stated, a comparing means 142 compares the flow rate signal from the pressure transducer 128 with a selectable standard. A motor driver circuit 144 is connected with the comparing means to drive the butterfly damper control motor clockwise or counterclockwise as is required to bring the pneumo-electric transducer flow rate signal into conformity with the selected standard. A low flow rate detector 146 detects when the filter cartridge is ready to be cleaned. More specifically, the low flow rate detector 146 detects when the butterfly damper is no longer able to provide the selected flow rate. In the simplified control circuit, the low flow rate detector comprises a comparator which compares the transducer flow rate signal with a lower, preselected minimum flow rate. Alternately, the low flow rate detector may include a limit switch which detects when the butterfly damper is fully open, or the like. The low flow rate detector actuates a cleaning cycle control means 148 such as a cyclic timer. The cleaning cycle control means 148 immediately causes the motor driver 144 to drive the butterfly damper control motor 140 until the butterfly damper is fully closed and continues to hold the butterfly damper fully closed during the cleaning cycle. After the butterfly damper is closed, the cleaning cycle control means produces one or a series of intermittent cleaning means actuating pulses or firing signals. After each firing signal, a sufficient delay is provided for the particulates which have been cleaned from the filter cartridges to fall into the hopper 12. At the end of the cleaning cycle, the cleaning cycle control means butterfly damper closing signal is removed allowing the butterfly damper to recommence controlling the fluid rate through the exhaust duct.

With continued reference to FIG. 1 and further reference to FIG. 10, during the cleaning cycle, the cleaning means G is actuated. The cleaning means G includes a shock wave generator in fluid communication with each filter cartridge. In the preferred embodiment, the shock wave generators are connected with the plenum means E to facilitate gaining access to the filter cartridges. Optionally, as shown in phantom in FIGS. 1 and 2, shock wave generators 149 may be connected with the bottom of each filter cartridge. Connecting a shock wave generator with both the top and bottom enables the filter cartridges to be up to twice the length of normal shock wave propagation. A typical one of the shock wave generators includes a pressure vessel or reservoir 150 which holds a reserve of air or other gas under pressure. The amount of pressure and volume of air in the reservoir are preselected in accordance with the shock wave which it is desired to produce for cleaning the filter cartridges. A stronger shock wave tends to clean the filter medium more completely. However, to filter smaller particles, a residual layer of filtered particles, or residual filter cake, is retained on the filter medium to reduce its effective opening size. The thickness of the residual filter cake is adjusted by adjusting the strength of the shock wave. The pressure reservoir 150 has a compressed gas receiving flange 152 and compressed air receiving gasket 154 through which pressurized air for recharging the pressure vessel is received. At its plenum end, the pressure vessel has a valve assembly mounting flange 156 and valve assembly mounting gasket 158 to which a valve body 160 is attached. The valve body has a shock wave generator mounting flange 162 which is connected by a shock wave mounting gasket 164 with the upper plenum wall shock wave operator mounting flange 112. The valve body 160 further includes a valve mounting flange 166 which is connected with the valve mounting flange gasket 158 and the valve assembly mounting flange 156.

A lower valve seat 170 is disposed in the valve body 160. One side of the lower valve seat is connected by a plurality of valve ports 172 with the interior of the pressure reservoir 150. A movable valving element, particularly a ball valve 174, piston, or the like, selectively seats against the lower valve seat 170 to block the compressed air in the reservoir 150 from flowing through the valve seat into the exhaust plenum. The valve body 160 has an upper cylindrical wall portion 176 through which the ports 172 are disposed. The valve cylindrical wall 176 has an interior cross section which closely conforms to the diameter of the ball valve 174 such that the ball valve is received in a generally fluid sealing, sliding engagement with the valve cylindrical wall. Disposed adjacent the upper end of the valve body 160 is an upper valve seat 178. Disposed across the top of the valve body is a valve body upper cover plate 180. A compressed air inlet pipe 182 extends through the mounting flange 152 and the valve body cover plate 180 into fluid communication with the upper portion of the valve body above the ball valve 174. A check valve 184 permits compressed air to flow from the upper portion of the valve body into the interior of the pressure vessel 150 and prohibits air from flowing from the pressure vessel into the upper portion of the valve body. A three-way solenoid valve 186 selectively supplies compressed air to the compressed air inlet pipe 182 and the upper portion of the valve housing or vents the inlet pipe 182 and upper portion of the valve body to the atmosphere. The solenoid valve is connected with the cleaning cycle control circuit 148 to vent the upper portion of the valve housing to the atmosphere in response to the firing signal. A common pressure regulating valve 188 regulates the pressure of the air in the reservoir 150 of all of the pneumatic shock wave generators to control the intensity of the shock waves.

In operation, the three-way solenoid valve 186 allows compressed air to pass through the pipe 182 into the upper portion of the valve housing 160. This pressure biases the ball valve 174 firmly against the lower valve seat 170, blocking compressed air in the pressure vessel 150 from flowing into the plenum. The compressed air in the upper portion of the valve housing opens the check valve 184 and flows into the interior of the pressure reservoir 150. When the pressure within the reservoir 150 plus the biasing force of the check valve equals or exceeds the pressure in the upper valve body portion, the check valve closes and an equilibrium condition is reached. In this condition, pressure against the ball valve 174 through the ports 172 is less than the pressure on the ball valve from the upper portion of the valve body. Thus, the net force urges the ball valve against the lower valve seat 170. When the filter cartridge is to be cleaned, the three-way solenoid valve 186 vents the upper portion of the valve body to the atmosphere. This creates a pressure differential across the ball valve 174 shifting it from the lower valve seat 170 to the upper valve seat 178. This allows the compressed air in the reservoir to escape through the lower valve seat 170 into the plenum. This sudden release of the compressed air creates a shock wave which acts to clean the filter cartridge.

Connected with the plenum shock wave generator mounting flange 112 and in fluid communication with the valve body 160 is a nozzle or diffuser for directing the shock wave toward the filter cartridge. In one embodiment, the nozzle comprises a mach nozzle 190 which receives the rapidly exhausted compressed air forming it into a sonic shock wave which passes down the filter cartridge. The shock wave expands and passes through the filter medium knocking the caked particles from the surface. In another embodiment, illustrated in FIG. 11, the nozzle comprises a diffuser nozzle 192 which creates a subsonic shock wave. The diffuser nozzle includes an outer cone 194 and an inner cone 196 which channel the exhaust gases into an annular path along the periphery of the filter medium. Alternately, the nozzle may be deleted and the filter medium cleaned by reverse air cleaning.

Figure 12A:
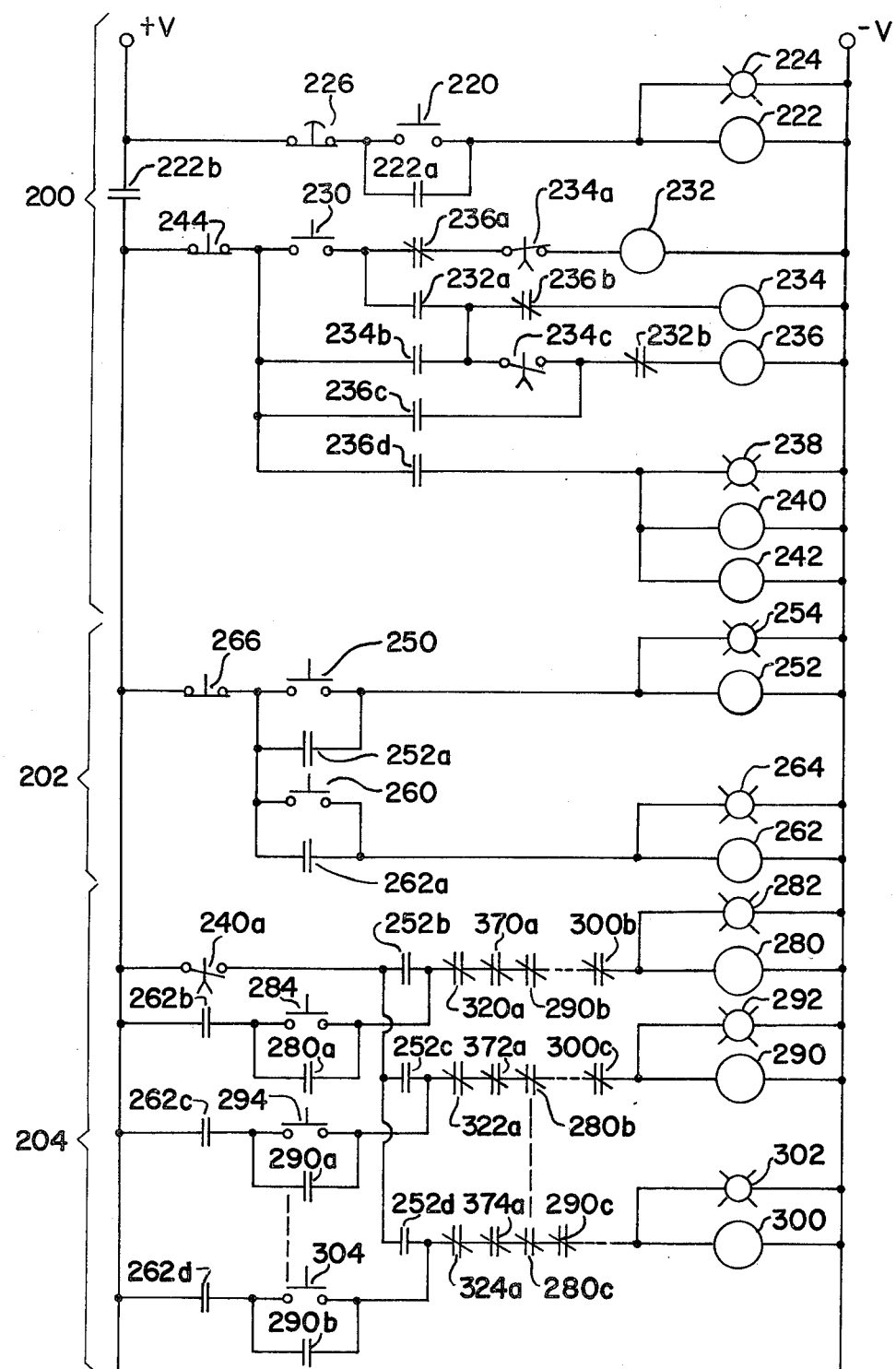
FIGS. 12A, B, and C illustrate an electrical control circuit for controlling the air flow regulator and pneumatic shock wave generator of FIG. 1.
Figure 12B:
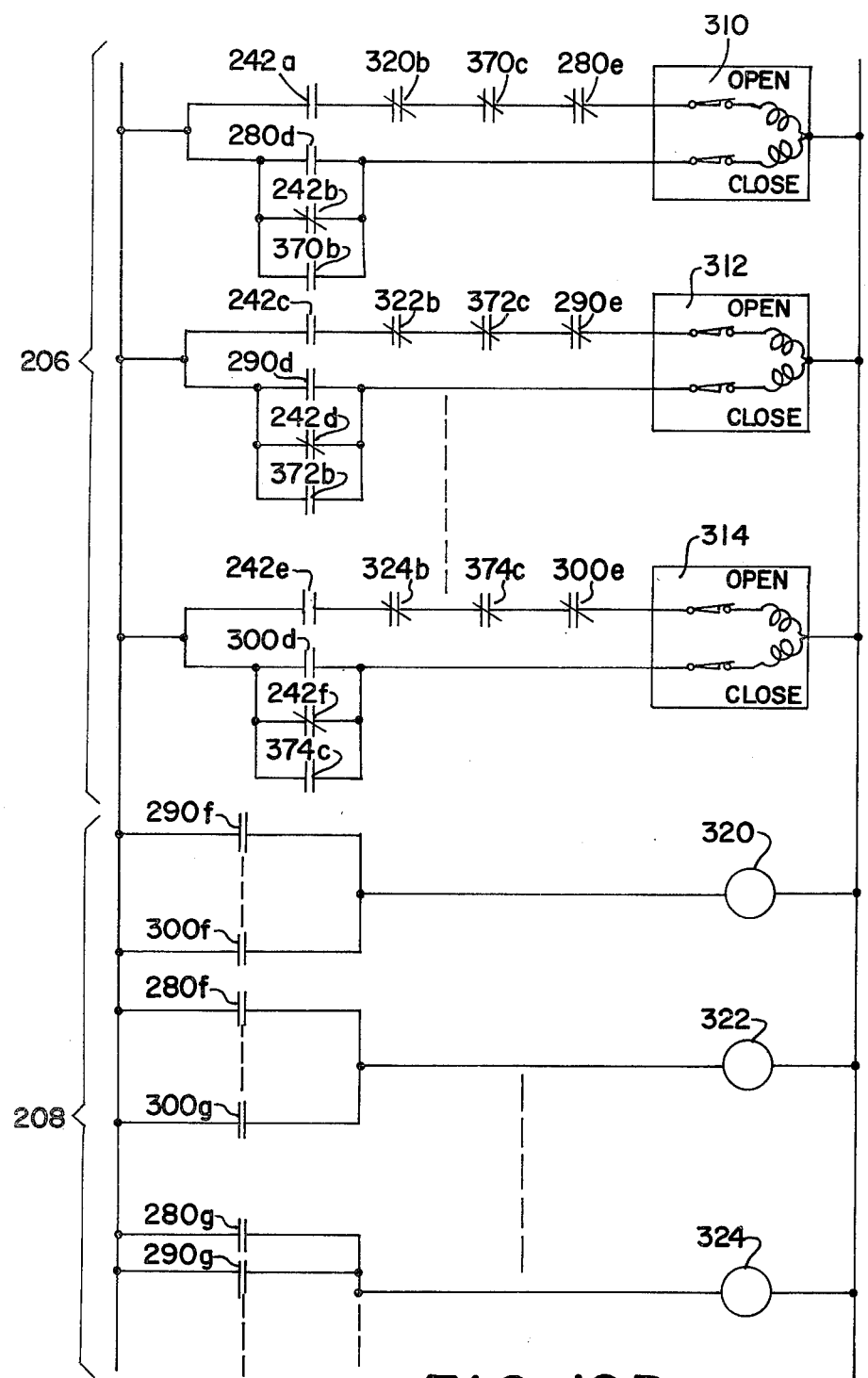
Figure 12C:
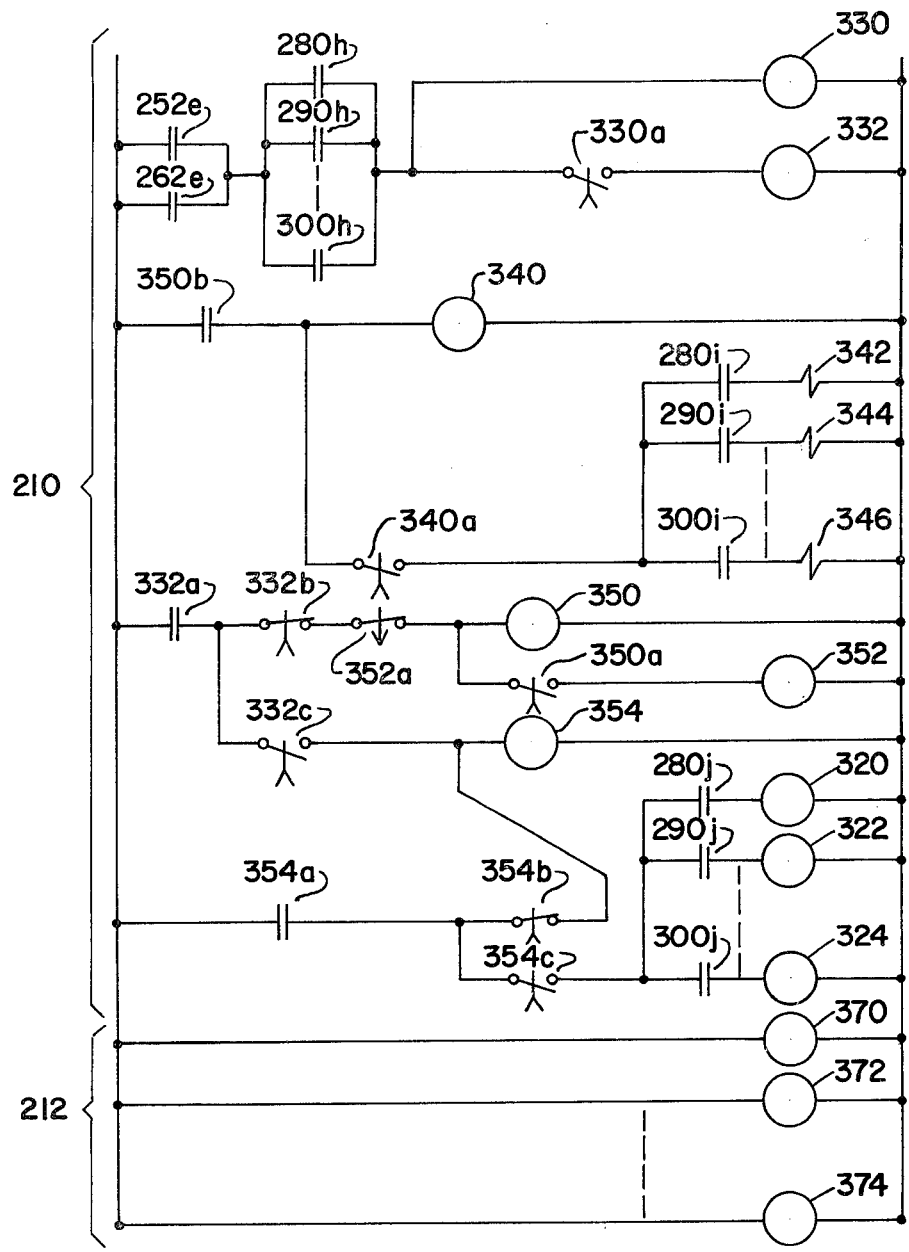

With reference to FIGS. 12A, B, and C, a circuit is provided for controlling the flow regulating motor 140, the solenoid valve 186 of the cleaning means G, the blower B, and the like. The control circuit includes a blower motor start up subcircuit 200 which supplies power to the blower motor B in incrementally increasing steps to bring it smoothly up to full speed. A manual or automatic mode selection subcircuit 202 allows the filters to be cleaned automatically in response to a preselected pressure drop or manually. A filter cleaning lockout subcircuit 204 permits only one filter cartridge to be cleaned at a time. While one filter cartridge is being cleaned, the filter cleaning lockout circuit disables the other filter cartridges from being cleaned. A damper motor control subcircuit 206 controls the position of the butterfly damper blades in the exhaust ducts. The damper motor control circuit allows each damper motor to open the associated damper when the filter cartridge is functioning normally and to close the associated damper when the blower motor is not up to speed, during cleaning cycle, and when the fitler cartridge is being held in a standby mode. A memory subcircuit 208 remembers which filter cartridge is being held in a standby mode, i.e., which filter cartridge in the preferred embodiment was last cleaned. A cleaning control cycle subcircuit 210 controls the cleaning cycle of the selected filter cartridge. An exhaust flow rate detecting subcircuit 212 detects when the flow rate of air through each of the filter cartridges is above or below a preselected minimum.

By way of convention in the following circuit description, relay coils are denoted by a reference numeral and relay contacts are denoted by the same reference numeral as the corresponding coil followed by a lower case letter. The blower motor start up subcircuit 200 includes a master start push button 220 which is depressed to provide power to a master control relay coil 222. The master control relay coil 222 closes a normally open relay contact 222a which holds the relay on and closes a normally open relay contact 222b which provides power to the remainder of the circuit. An indicator lamp 224 indicates that the power is on. Shutting off the control circuit is achieved with master stop push button 226.

The exhaust blower B is started by pressing an exhaust blower start push button 230. The blower start push button supplies power to a first blower start relay coil 232. A normally open first blower start relay contact 232a closes supplying power to a second blower start relay coil 234. After a short delay, a contact 234c closes supplying power to a blower running relay coil 236 and, after a longer delay, a second blower start relay contact 234a opens releasing the first blower start relay coil 232. A normally closed blower running relay contact 236a releases the second blower start relay coil 234 and a normally open blower running relay contact 236c holds the blower start relay coil 236 actuated. The relay coils 232, 234, and 236 have contacts (not shown) which are connected with an autotransformer starter for bringing the blower motor B progressively up to speed. When the blower is running at full power, the blower running relay coil 236 closes a normally open relay contact 236d which supplies power to a blower running indicator lamp 238 and actuates a damper delay relay coil 240 and an automatic damper closing delay relay coil 242. The damper delay relay 240 comprises a timed delay relay which, after a preselected time delay, closes a damper delay relay contact 240a to provide power to the filter cleaning lockout subcircuit 104. A blower stop push button 244 cuts off power to the blower control relays.

The mode selection subcircuit 202 includes an automatic mode push button 250 which is depressed to actuate an automatic mode control relay coil 252 and an automatic mode indicator light 254. If the control circuit is to be run in a manual mode, push button 260 is depressed to actuate a manual mode relay coil 262 and a manual mode indicator light 264. A shutoff push button 266 releases the manual automatic mode relays.

The filter cleaning lockout subcircuit 204 includes the normally open damper delay relay contact 240a which closes a short time after the blower motor reaches full speed. The lockout subcircuit further includes a first filter lockout relay coil 280 which blocks cleaning of the other filters while the first filter is being cleaned. A first filter cleaning indicator lamp 282 is connected in parallel with the relay coil 280. A manual first filter cleaning push button 284 provides for manual cleaning of the first filter. Similarly, a second filter lockout relay coil 290 and indicator lamp 292 are actuated when the second filter is cleaned. A second filter manual cleaning push button 294 is also provided. The exact number of cleaning cycle filter lockout relays corresponds with the number of filter cartridges. For simplicity of illustration, the filter cleaning cycle relays and associated circuitry, corresponding to the filter cartridges between the second and last filter cartridges, have been omitted from the drawings. It is to be appreciated that the total number of filter cartridges and, hence, associated circuits are selected in accordance with the filtering requirements of the overall air filtration system. A last filter lockout relay 300 and indicator lamp 302 are actuated when the last filter is cleaned. A last filter manual cleaning push button 304 enables manual actuation of the cleaning cycle of the last filter. Each of the filter lockout relays has a normally closed relay contact in series with each of the other filter lockout relay coils. Thus, during a cleaning cycle when one of the lockout relays is actuated, its normally closed contacts are open to prevent power from reaching the other filter lockout relay coils.

The damper motor control circuit 206 includes a first damper motor 310 which selectively opens and closes a damper in the exhaust duct of the first filter cartridge, a second damper motor 312 which opens and closes a damper in the exhaust duct of the second filter cartridge, a plurlity of intermediate filter damper control motors (not shown), and a last damper control motor 314 which opens and closes a damper in the exhaust duct of the last filter cartridge.

The memory subcircuit 208 includes a first filter memory latching relay 320 corresponding to the first filter cartridge, a second filter memory latching relay, 322 several intermediate filter memory latching relays (not shown), and a last filter memory latching relay 324. Each of the latching relays has an unlatching winding connected in series with the parallel collection of normally open relay contacts of the filter lockout relays 280, 290, and 300. More specifically, each unlatching winding is connected in series with the parallel grouping of the normally open relay contacts of the lockout relay coils corresponding to each of the other filter cartridges but not the same filter cartridge as the filter memory latching relay.

The cleaning control subcircuit 210 includes parallel connected manual and automatic mode normally open relay contacts 252e and 262e. Connected in series with the manual and automatic mode relay contacts is a parallel connected group of normally open filter lockout relay contacts 280g, 290g, and 300g. When in either the automatic or manual mode and one of the lockout relays is actuated, a damper delay relay 330 is actuated. After sufficient time for the damper to close, a damper delay normally open contact 330a actuates a filter cleaning counter relay 332.

The cleaning control subcircuit also includes a cleaning timer relay 340 which times each cleaning cycle. The cleaning timer relay 340 has a normally open time delayed contact 340a which is connected in series with a first filter cartridge three-way solenoid valve 342 for releasing the shock wave into the first filter cartridge, a second filter three-way solenoid valve 344 for releasing the shock wave into the second filter cartridge, a plurality of intermediate filter cartridge three-way solenoid valves (not shown) for releasing the shock wave into the intermediate filter cartridges, and a last filter three-way solenoid valve 346 for releasing the pneumatic shock wave into the last filter cartridge. Each of the three-way solenoid valves is connected in series with a normally open contact of the corresponding filter lockout relay such that only the solenoid valve corresponding to the actuated lockout relay can be actuated by the cleaning timer relay 340. The three-way solenoid valves 342, 344, and 346 correspond to the earlier recited three-way solenoid valve 186 of the typical cleaning means G illustrated in FIG. 10.

The cleaning control subcircuit further includes a recharge timer relay 350 which is actuated after a pneumatic shock wave is released to insure that adequate time is provided for the corresponding compressed air reservoir to be recharged before another cleaning of the filter cartridge is attempted. The recharged timer relay 350 has a time delayed normally open relay contact 350a which actuates an off delay reset timer relay 352 which with a time delay contact 352a resets the recharge timer relay 350. A damper open delay timer relay 354 is actuated by a normally open time delayed relay contact 332c of the cleaning counter relay 332. After the appropriate delay, the damper open timer delay relay 354 closes a time delayed normally open relay contact 354c which causes the filter memory subcircuit to record which filter has been cleaned. More specifically, the latching coil of the first filter cartridge memory latching relay 320 is connected in series with a normally open contact 280j of the first filter latching relay coil, the latching winding of the second filter memory latching relay 322 is connected in series with a normally open contact 290j of the second filter cleaning lockout relay, and so forth.

The flow rate sensing subcircuit 212 includes a first filter flow rate monitoring relay 370, a second filter flow rate monitoring relay 372, intermediate filter monitoring relays (not shown), and a last filter flow rate monitoring relay 374. The flow rate monitoring relays are unactuated below a preselected minimum flow rate at which a cleaning cycle is to be commenced and are held actuated by flow rate greater than the preselected minimum.

To facilitate understanding the control circuit, an example is now given in which the first filter cartridge is being held in reserve and the second filter cartridge flow rate monitoring switch 372 detects that the flow rate through the second filter cartridge has reached the preselected minimum. Detecting the preselected minimum flow rate deactuates the second filter flow rate monitoring relay 372, closing its contact 372a in the lockout circuit 204. Assuming that the circuit is in the automatic mode and no other filters are being cleaned, the automatic mode relay contacts 252c will be closed. Because the second filter cartridge is not being held in reserve, relay contact 322a of the memory latching relay is closed. When none of the other filters are being cleaned, the normally closed contacts of the other lockout relays, including contacts 280b and 300c, are also closed. This allows the second filter lockout relay 290 to be actuated which disables all of the other lockout relays from being actuated. In the damper motor control subcircuit 206, a normally open relay contact 372b of the second filter flow rate detecting relay is closed driving the second damper motor 312 to its closed position and a normally closed contact 372c is opened preventing the second damper motor from being driven toward its open position. Actuation of the second filter lockout relay 290 closes a normally open contact 290d holding the second damper motor in its closed position. With reference to the memory subcircuit 208, actuation of the second filter lockout relay coil 290 closes normally open relay contacts 290f and 290g providing power to the unlatching coils of the latching memory relays, except for the second filter latching relay 322. More specifically, it releases the first filter latching relay 320 which has been held in standby closing relay contact 320b allowing the first damper motor 310 to open removing the first filter from standby. With reference to the cleaning cycle control subcircuit 210, actuation of the second lockout relay closes contact 290h supplying power to the damper delay timer relay 330. After a period of time sufficient for the second damper motor 312 to close the second damper, relay contact 330a is closed actuating the filter cleaning counter relay 332. Actuation of the filter cleaning counter relay 332 closes relay contact 332a providing power to the recharge timer relay coil 350 closing relay contact 350b. Closing relay contact 350b actuates cleaning timer relay 340 which closes time delay contact 340a providing power through the second filter latching relay contact 290i to the second filter cleaning three-way solenoid valve 344 to release a pneumatic shock wave into the second filter cartridge. The recharge timer relay 340 times out closing relay contact 350a energizing the reset timer relay 352 for another cleaning cycle. The number of cleaning cycles to be repeated for the second filter is determined by the setting of the filter cleaning cycle counting relay 332. Either a single pneumatic shock wave or several of such shock waves may advantageously be generated. After the cleaning cycle counter relay counts out, relay contact 332b opens and 332c closes de-energizing the recharge timer relay 350 and energizing the damper opening delay timer relay 354. After a preset time, relay contacts 354c close energizing the latching coil of the second filter memory latching relay 322 putting the second filter in standby. When the second filter memory latching relay 322 latches, relay contact 322a is opened releasing the second filter lockout relay coil 290 to complete a cleaning cycle.

Figure 13:
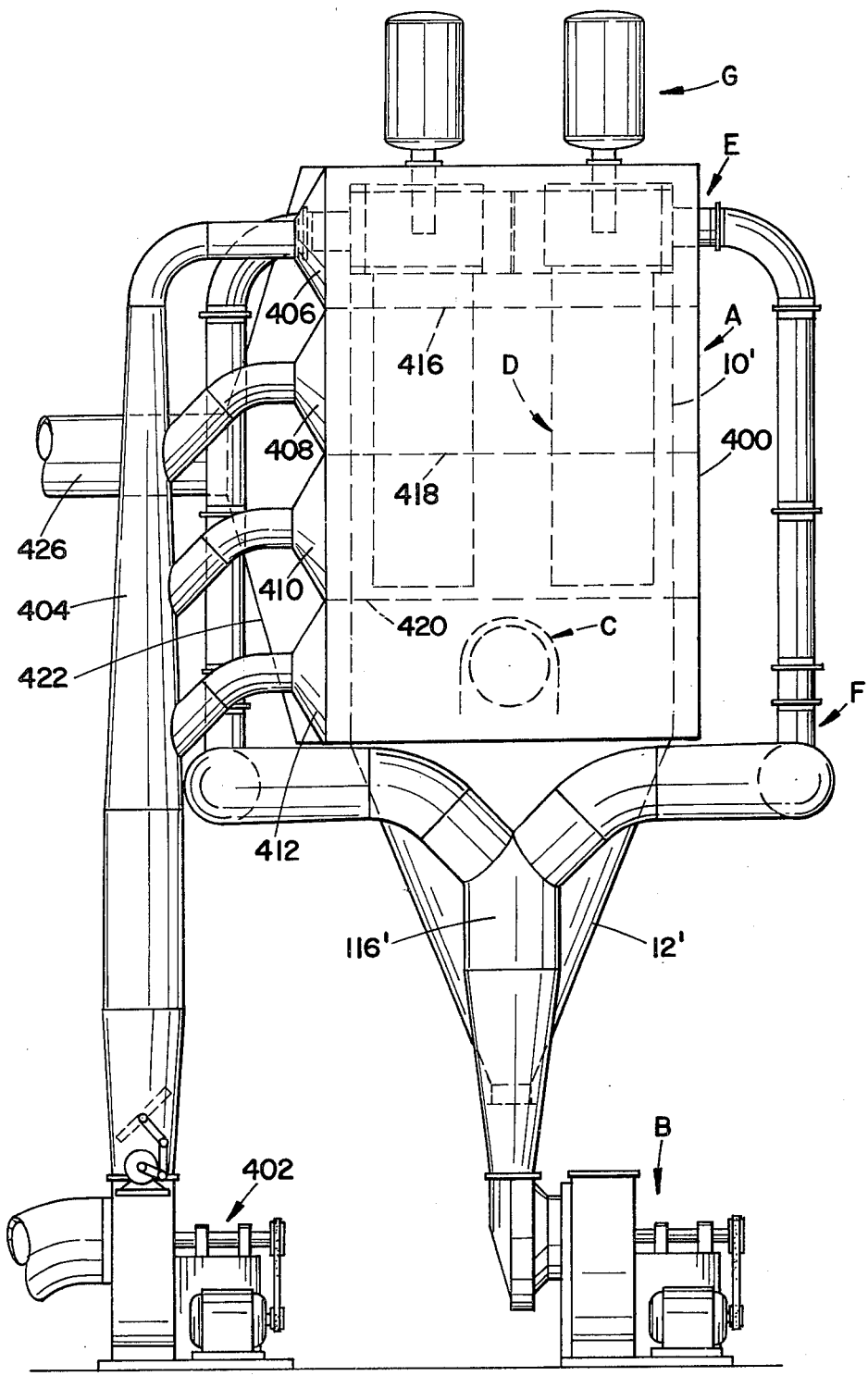
FIG. 13 is a side elevation view of an alternate embodiment of a filter module in combination with a heat recovery system.
Figure 14:
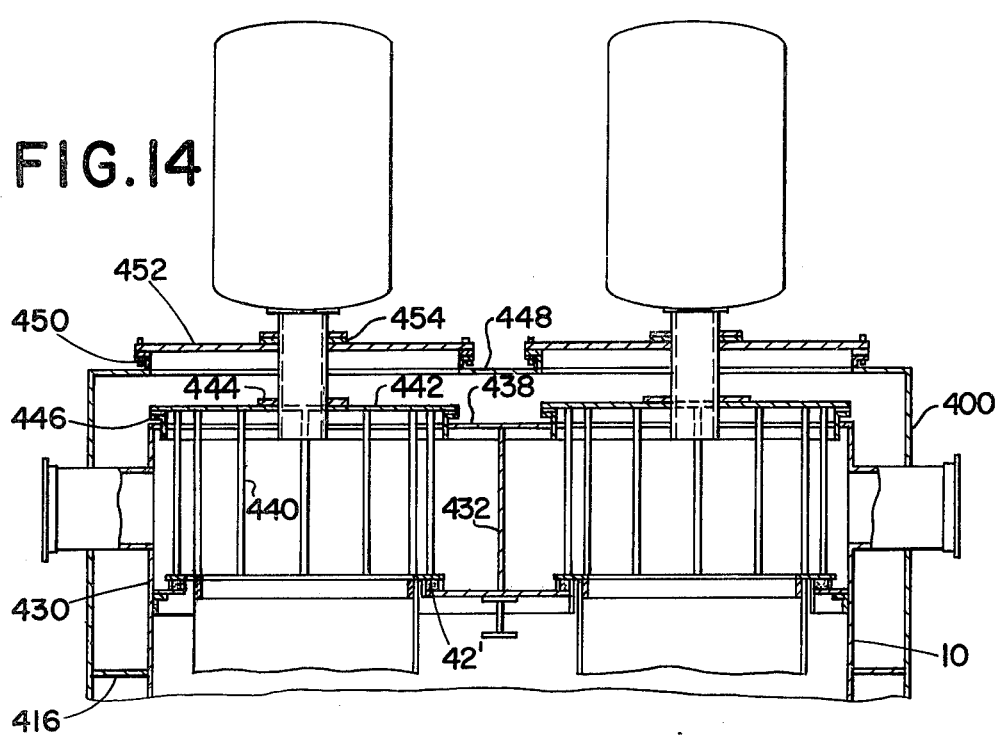
FIG. 14 is a partial side view of the filter module of FIG. 13 in partial section; and, FIG. 15 is a plan view of the filter module of FIG. 13.
Figure 15:
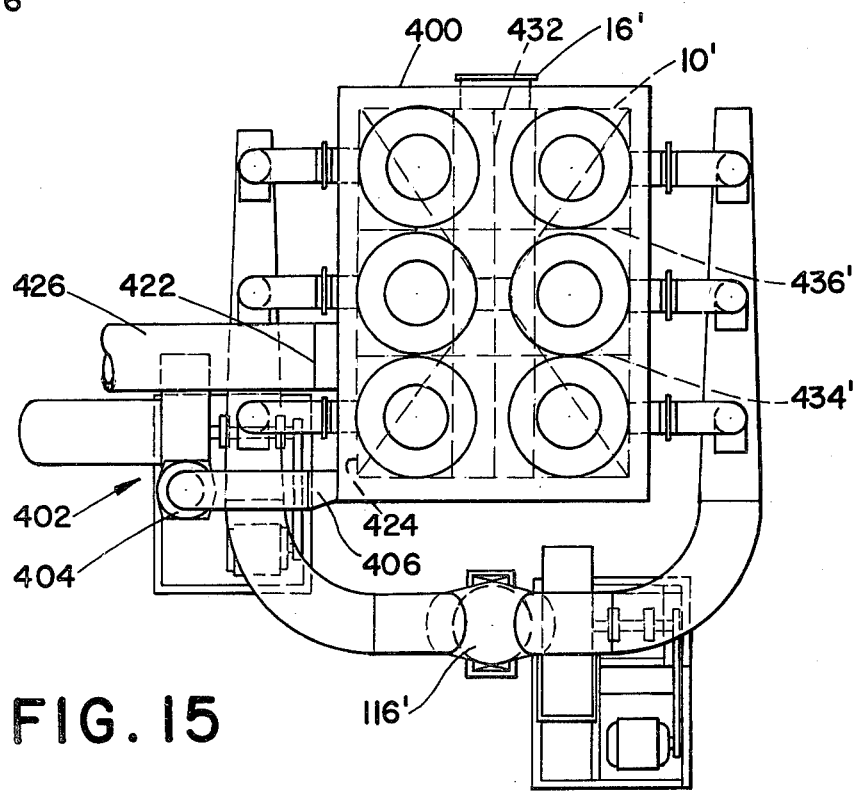

With reference to FIGS. 13, 14, and 15, an alternate embodiment of the filter module including a heat exchanger is illustrated. In the embodiment of FIGS. 13-15, elements common with the embodiment of FIGS. 1-12 are designated by like reference numerals followed by a primed (') suffix. The filter module A includes an enclosed housing 10' which is connected with a hopper 12' for receiving filtered particles. The air to be filtered is received from an insulated inlet duct through an inlet opening defined by an inlet ring 16' adjacent an inertial separator C. An insulated heat exchanger housing 400 surrounds the enclosed housing 10' and may, optionally, surround all or part of the hopper 12'. A heat exchanger blower 402 pumps cool air to a heat exchanger manifold 404 and into a plurality of cool air inlets 406, 408, 410, and 412 which are disposed vertically along one corner of the filter module. Optionally, a preliminary heat exchanger may be connected between the heat exchanger manifold 404 and an exhaust duct manifold 116' to preheat the air from the heat exchanger blower 402. Disposed between the heat exchanger housing 400 and the enclosed housing 10' are a plurality of horizontal heat exchanger baffles 416, 418, and 420 which extend circumferentially around the enclosed housing 10'. The baffles, the heat exchanger housing, and the enclosed housing define a plurality of heat exchange paths from the inlets circumferentially around the enclosed housing to a heat exchanger outlet 422. Alternately, the enclosed housing may be constructed of connected tubing portions which define the plurality of heat exchange paths. A layer of insulation and outer shell may surround the enclosed housing tubing walls. The heat exchanger outlet 422 is disposed in communication with each of the four heat exchange paths. A vertical heat exchanger divider 424 divides the heat exchanger inlets and outlet such that the cool air must move circumferentially around the entire enclosed housing as it moves from the heat exchanger inlets to the heat exchanger outlet. The heat exchanger outlet is connected with a heat exchanger discharge tube 426 which conveys the recovered heat to a process or apparatus in which it is utilized.

The plenum means E includes a plenum outer wall 430 which surrounds all six plenums. A plenum longitudinal wall 432 divides the plenum area into two halves and a pair of plenum transverse walls 434 and 436 divides the plenum area into six discrete regions. A plenum top wall 438 extends across the top of the plenum outer, longitudinal, and transverse walls. A plurality of support rods 440 are disposed within each of the six discrete plenum regions and extend from an upper filter cartridge mounting plate 42' to a corresponding upper plenum access plate 442. Each plenum access plate 442 has a mounting area 444 for receiving an end of the cleaning means G therethrough. Each plenum access plate is received on an upper plenum flange 446 which defines an upper plenum opening that is large enough to receive the filter cartridge and the upper filter cartridge mounting plate 42'. The heat exchanger includes a heat exchanger top wall 448 having a plurality of filter cartridge access opening defining flanges 450. Mounted across each of the filter cartridge access flanges is a heat exchanger top wall access opening closure plate 452. The heat exchanger closure plate includes a cleaning means mounting flange 454 against which the cleaning means G is mounted in a fluid tight connection. The heat exchanger access opening is larger than the plenum access plate 442 such that the filter cartridge, filter cartridge mounting plate, and the plenum mounting plate can be received therethrough.

The invention has been described with reference to preferred and alternative embodiments. Obviously, modifications and alterations will occur to others upon a reading and understanding of the specification. It is intended that the invention be construed as including all such alterations and modifications which come within the scope of the appended claims or the equivalents thereof.

Having thus described preferred and alternate embodiments of the invention, the invention is now claimed to be:

1. An air filtration system comprising:
   an enclosed housing having an inlet aperture for receiving air to be filtered, a lower collection region for accumulating particles filtered from the received air, a top wall having a plurality of openings, and a mounting flange surrounding each top wall opening;
   a filter cartridge extending downward from each top wall opening into the enclosed housing, and including:
      an upper filter medium mounting ring which is operatively connnected with the mounting flange,
      a lower filter medium mounting ring, disposed substantially parallel to the upper mounting ring,
      a joint bar extending between the upper and lower mounting rings and generally perpendicular thereto, the joint bar having a first column of outward extending elongated mechanical fasteners disposed at intervals between the upper and lower mounting rings and a plurality of apertures therethrough spaced from said first column of elongated mechanical fasteners with said apertures disposed at intervals between the upper and lower mounting rings,
      a filter medium support grid having a multiplicity of apertures therein, the filter medium support grid being generally tubular and connected at one end with the upper filter medium mounting ring and at its other end with the lower filter medium mounting ring,
      a woven metal mesh filter medium having a height sufficient to extend between the upper and lower mounting rings and a length between first and second vertical edges to extend around the filter medium support grid from the joint bar elongated mechanical fasteners to the joint bar apertures, the filter medium defining a first plurality of apertures adjacent the first filter medium vertical edge in alignment with the joint bar elongated mechanical fasteners, the joint bar elongated mechanical fasteners extending through the first vertical edge apertures, and a second plurality of apertures adjacent the second filter medium vertical edge and in alignment with the joint bar apertures, and
      a second column of mechanical fasteners extending through the aligned joint bar and filter medium second vertical edge apertures to fasten the filter medium to the joint bar; and,
   a plenum means disposed in fluid communication with the top wall openings for receiving filtered air therefrom.

2. The filtration system as set forth in claim 1 wherein the upper and lower filter mounting rings are smaller in circumference than the top wall opening such that the filter cartridge is removable through said top wall opening.

3. The filtration system as set forth in claim 2 wherein the filter medium support grid is a nonwoven, welded wire cage.

4. The filtration system as set forth in claim 2 wherein the upper filter mounting ring is connected with an outward extending filter cartridge mounting plate which is larger in outer circumference than the top wall opening, the filter cartridge mounting plate being supported by the mounting flange.

5. The filtration system as set forth in claim 4 wherein the mounting flange and the filter cartridge mounting plate having a plurality of aligned bolt receiving apertures therethrough.

6. The filtration system as set forth in claim 2 further including an impingement plate disposed generally horizontally above the enclosed housing inlet aperture and below the filter cartridges such that unfiltered air must turn to get from the inlet aperture to the filter cartridges, whereby the momentum of heavier particles inhibits them from making the turn causing them to fall into the collection region.

7. The filtration system as set forth in claim 6 wherein the impingement plate has downward extending side edges which terminate below the inlet aperture such that received air moves downward toward the side edges and turns upward at the side edges towards the filter cartridges, whereby the momentum of the particles tends to carry them downward toward the collection region.

8. The filtration system as set forth in claim 7 wherein the impingement plate has a U-shaped cross section.

9. The filtration system as set forth in claim 1 wherein the filter medium is calandered.

10. The filtration system as set forth in claim 1 further including a lower sealing plate mounted in the interior of the lower filter medium mounting ring for blocking air flow through the interior of the lower filter medium mounting ring.

11. The filtration system as set forth in claim 10 further including a shock wave generator having a shock wave outlet disposed in said plenum means.

12. The filtration system as set forth in claim 11 further including flow rate controlling means for maintaining the flow rate through the plenum means at a substantially constant preselected rate and cleaning cycle control means for actuating the shock wave generator in response to the flow rate dropping below the preselected rate.

13. An air filtration system comprising:
an enclosed housing having an inlet aperture for receiving air to be filtered, a lower collection region for accumulating particles filtered from the received air, a top wall having a plurality of openings, and an annular mounting flange surrounding each top wall opening, the mounting flange being mounted displaced from and parallel to the top wall by a sleeve portion;
an annular cartridge mounting gasket disposed on the mounting flange;
a filter cartridge extending downward from each top wall opening into the enclosed housing, and including an upper filter medium mounting ring, an annular filter cartridge mounting plate extending outward from the upper mounting ring and being disposed on the cartridge mounting gasket such that the cartridge mounting gasket provides a seal between the filter cartridge mounting plate and the mounting flange, a lower filter medium mounting ring, a filter medium support grid having a multiplicity of apertures therein, the filter medium support grid being tubular and connected at one end with the upper filter medium mounting ring and at its other end with the lower filter medium mounting ring, and a woven filter medium surrounding the filter medium support grid;
an annular exhaust plenum mounting gasket disposed on the filter cartridge mounting plate;
a plenum adjacent each top wall opening for receiving filtered air from the filter cartridge, the plenum including an annular exhaust plenum mounting ring disposed on the exhaust plenum mounting gasket such that the plenum is sealingly mounted to the filter cartridge mounting plate and the housing mounting flange; and,
a plurality of mechanical fasteners extending through at least the exhaust plenum mounting ring, and the mounting flange such that the plenum and filter cartridge are selectively removable from the housing.

14. The filtration system as set forth in claim 13 further including a joint bar extending from the upper filter medium mounting ring to the lower filter medium mounting ring, the filter medium having a first edge which is releasably connected with the joint bar, the filter medium extending from the first edge peripherally around the filter medium support grid and terminating in a second edge which is releasably connected with the joint bar, the first and second filter medium edges being disposed in an abutting, nonoverlapping relative disposition.

15. The filtration system as set forth in claim 14 wherein the joint bar has a plurality of outward extending mechanical fasteners and the filter medium first edge has a plurality of corresponding apertures such that the filter medium corresponding apertures are adapted to receive the joint bar outward extending fasteners positioning the filter medium first edge to facilitate wrapping the filter medium tightly around the periphery of the filter medium support grid.

16. The filtration system as set forth in claim 15 wherein the filter medium joint bar and the filter medium second edge have a plurality of cooperating apertures which are adapted to receive mechanical fasteners therethrough.

17. The filtration system as set forth in claim 16 further including a joint gasket disposed adjacent the joint bar and the filter medium first and second edges and a compression bar means for pressing the joint gasket against the filter medium first and second edges and the filter medium first and second edges against the joint bar.

* * * * *